US008463667B2

(12) United States Patent
Stine et al.

(10) Patent No.: US 8,463,667 B2
(45) Date of Patent: Jun. 11, 2013

(54) EXPORTING AND IMPORTING BUSINESS TEMPLATES

(75) Inventors: Christopher P. Stine, Newcastle, WA (US); Donna Daem, Bellevue, WA (US); Srinivasan Parthasarathy, Redmond, WA (US); Ingibjorg Numadottir, Yarrow Point, WA (US); Brett M. Davis, Redmond, WA (US); Jesper K. Olsen, Kirkland, WA (US); Guner Akturk, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1117 days.

(21) Appl. No.: 11/972,789

(22) Filed: Jan. 11, 2008

(65) Prior Publication Data

US 2009/0182567 A1 Jul. 16, 2009

(51) Int. Cl.
*G07B 17/00* (2006.01)
*G07F 19/00* (2006.01)

(52) U.S. Cl.
USPC .......................................................... 705/30

(58) Field of Classification Search
None
See application file for complete search history.

(56) References Cited

U.S. PATENT DOCUMENTS

| | | | |
|---|---|---|---|
| 5,991,766 A * | 11/1999 | Sadiq et al. ........................... | 1/1 |
| 6,598,219 B1 | 7/2003 | Lau et al. | |
| 6,789,252 B1 | 9/2004 | Burke et al. | |
| 6,889,229 B1 * | 5/2005 | Wong et al. ................... | 707/610 |
| 6,947,951 B1 | 9/2005 | Gill | |
| 2002/0069083 A1 | 6/2002 | Harter et al. | |
| 2003/0167229 A1 | 9/2003 | Ludwig et al. | |
| 2004/0073868 A1 | 4/2004 | Easter et al. | |
| 2004/0181753 A1 | 9/2004 | Michaelides | |
| 2005/0021348 A1 | 1/2005 | Chan et al. | |
| 2006/0031147 A1 | 2/2006 | Bell et al. | |
| 2007/0112866 A1 * | 5/2007 | Olson-Williams ............ | 707/200 |

FOREIGN PATENT DOCUMENTS

WO WO2004012081 2/2004

OTHER PUBLICATIONS

"Export/Import Template," http://www.phpcow.com/?c=143&a=1133 [last accessed Oct. 15, 2008], PHPCow LLC, 1 page.
"How Do I Create a Chart of Accounts Using Business Template?" http://shopping.netsuite.com/s.nl/c.637836/ctype.KB/it.I/id.17817/KB.1179/. [last accessed Oct. 15, 2008], 2 pages.
"How to create a business template," http://www.erp5.org/HowToCreateBusinessTemplates [last accessed Oct. 15, 2008], Nexedi & ERP5 Community, 8 pages.

* cited by examiner

*Primary Examiner* — Paul Danneman
(74) *Attorney, Agent, or Firm* — Perkins Coie LLP (57) ABSTRACT

A method and system for configuring an instance of a business information application program based on data exported from an instance of the application program is provided. Each instance of the application program has a database storing an organizations' business data. Template providers desiring to provide a template containing configuration and instance data to organizations using the application program may use the application program to set up configuration and instance data for a particular type of organization. Once the database is populated with configuration and instance data, the template provider can use an export function to export the configuration and instance data to a template file. The template file is then provided to an organization that wants to initialize its database based on the template. The organization uses an import function to import configuration and instance data from the template into the organization's database.

20 Claims, 9 Drawing Sheets

EXPORTING AND IMPORTING BUSINESS TEMPLATES

BACKGROUND

Many organizations, such as companies and nonprofit organizations, use business information application programs to track their financial records, inventories, and other business-related information. These business information application programs include accounting programs, customer relation management programs, enterprise resource management programs, and so on. When an organization first installs a business information application program, it needs to specify the name of the organization (e.g., Acme Co.) and define the entities (e.g., chart of accounts and inventory items) used by the organization and configuration parameters, such as user interface labels for the entities (e.g., "cell phone number" rather than "mobile phone number"). Different types of organizations will typically define entities specific to a certain type of organization. For example, a restaurant may define an inventory account, while a law firm may have no need for an inventory account. Some business information application programs may pre-define entities that are specific to different types of organizations (e.g., restaurant). So, for example, when a restaurant installs the business information application program, the organization may specify that it is a restaurant and the business information application program may set up the database with restaurant-related entities.

Although the use of predefined entities for different types of organizations helps to alleviate some of the burden of defining all the entities for an organization, the organization would typically need to further customize the entities. For example, although a fast-food outlet and a catering service might be generally considered to be restaurants, they use very different business models and thus need to track different types of entities. The predefined entities for a restaurant may not fully satisfy the needs of either the fast-food outlet or the catering service. In such a case, both organizations may spend considerable efforts customizing business entities.

Some business information application programs allow a limited amount of information to be exported from the database of one organization and imported into the database of another organization. For example, some accounting programs may allow the chart of accounts to be exported from one organization and imported into the database of another organization. As another example, some business information application programs allow an organization to define new display pages for input and output of the organization's data. These display pages may be exported from the database of one organization and imported into the database of another organization. However, when these display pages are imported, they are simply listed as one of a series of available display pages that the user can select to interact with the business information application program.

Current business information application programs thus require extensive customization in order to meet an organization's information tracking needs.

SUMMARY

A method and system for configuring an instance of a business information application program based on data exported from an instance of the business information application program is provided. Each instance of the business information application program has a database for storing the business data of an organization. The business data includes configuration data specifying how the application program is to be configured and instance data for each instance of each type of entity represented in the database. A template provider who wants to provide a template containing configuration data and instance data to organizations using the business information application program may use the business information application program to set up the configuration data and instance data needed for a particular type of organization. Once the database has been populated with the instance data and configuration data, the template provider can use an export function to export the configuration data and instance data to a template file. The template file is then provided to an organization that wants to initialize its database based on the template. The organization uses an import function to import the instance data and configuration data from the template into the organization's database. The organization, however, will provide its own information defining the organization. A template provider may create an instance of the database for each type of organization for which the template provider wants to provide a template. The template provider may offer the templates to organizations via a web server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for configuring an instance of a business information application program based on data exported from another instance of the business information application program is provided. In some embodiments, a business template management system is used in conjunction with a business information application program to export data from one instance of the application program and import data into another instance of the application program. Each instance of the business information application program has a database for storing the business data of an organization. The business data includes configuration data specifying how the application program is to be configured and instance data for each instance of each type of entity represented in the database. For example, the configuration data may include a label to be displayed on a display page, and instance data may include information describing an inventory account or a product that is offered for sale by the organization. A template provider who wants to provide a template containing configuration data and instance data to organizations using the business information application program may use the business information application program to set up the configuration data and instance data needed for a particular type of organization (e.g., a fast-food outlet or catering service). Once the database has been populated with the instance data and configuration data, the template provider can use an export function of the business template management system to export the configuration data and instance data to a template file. That template file contains the information needed to initialize the database for a certain type of organization. The template file is then provided to an organization that wants to initialize its database based on the template. The organization uses an import function of the business template management system to import the instance data and configuration data from the template into the organization's database. The organization, however, will provide its own information defining the organization itself, such as by providing the organization's name or business type, and so on. A template provider may create an instance of the database for each type of organization for which the template provider wants to provide a template. Thus the template provider can provide a template that is customized to a very specific type of business, such as a fast-food outlet in King County, Wash. The template provider may offer the templates to organizations via a web server. The organizations can access the web server to download and pay for the templates of choice. Because the business template management system uses the instance data and configuration data generated by the business information application program itself, a special program is not needed to input the data for a template.

Templates provide a collection of business data that may be used to initialize or update a database of a business information application program. A database may be created by, for example, importing a template or manually configuring a database through the user interface of the business information application program. Once a database is created, a user may export a template by executing an export function of the business information application program. In some embodiments, the export function allows a user to select which entities of the instance data and configuration data the user would like to export. For example, an organization's database may consist of hundreds of accounts and configuration parameters. The user may only want to export the entities relevant to tracking information about employees. The user may select only those entities relevant to employee information. Once the appropriate entities are selected, the business template management system may copy the selected data to a template file. In some embodiments, a database may include some data that should be and other data that should not be exported to a template. For example, a database may contain private account information that an organization may not wish to share. In some embodiments, a user may require that certain entities or configuration options stored in the template file be imported if information within the template file is to be imported. For example, there may be dependencies between entities in the database, such as between an inventory entity and an entity that stores information about the items in the inventory. If the inventory entity is to be imported, the entity storing information about the items in the inventory should be imported as well.

After the template file is created, it can be supplied to another user to be imported by an import function of the business information application program. The import function allows a user to select a template to import and the data of the template that should be imported. For example, a template may consist of many accounts and configuration options but the user importing the data may only want to import the configuration options and the business data related to customer information. Once the appropriate data is selected, the importing function populates the database with the selected data.

In some embodiments, instance data and configuration data may be stored in layers to support the undoing, or rollback, of the importing of a template. The layers may store changes that have been made to the instance data and configuration data stored in the database. For example, if an imported template caused a new instance data entity to be added to the database, a new layer, created when the template was imported, may store an entry indicating that the entity was added. The layers allow an organization to roll the database back to a previous set of instance data and configuration data. For example, if an organization applied a template to the database creating a new layer to store the data in the template and the organization later decided that the template was inadequate, the organization could roll the database back to the way the database existed prior to importing the template. Similarly, the layers may allow an organization to roll forward to a point from which the database had previously been rolled back. For example, if the organization later decided that the rolled back template would suffice, it could then roll it forward, reincorporating the template into the database. In some embodiments, a new layer is created each time a template is imported. A layer may also record subsequent changes to the database so that when a layer is rolled back any changes that were dependent on the template could also be rolled back.

In some embodiments, instance data and configuration data are associated with a moniker so that the business information application program can uniquely identify data. For example, an accounts receivable account in a database of an instance of the business information application program may be associated with a globally unique identifier (GUID). If that account is later exported and then imported into a database of another instance of an application program, it will have the same moniker. The use of the same moniker allows the business information application programs to track the source of each entity even though the attributes (e.g., name) of the entities may change. For example, one organization may decide to name the inventory account in its database "Stock" while another organization may decide to name the inventory account in its database "Goods for Sale." The monikers also allow templates created in different languages to be properly imported and integrated. For example, a single moniker may be associated with entities named "Inventaire" and "Inventory." Monikers also allow the business information application program to identify information so that redundant data is not added to the database during the import process. For example, if the organization that named its inventory account "Stock" created a template based on its database, and the organization that named its inventory account "Goods for Sale" attempted to import the template, the business information application program would recognize that each account tracked the same information based on each account's associated moniker. The business information application program then merges the two entities instead of creating a new entity in the database. The monikers allow an organization to fully customize the business information application program without losing the functionality provided by the business template management system.

When a business information application program attempts to import a template containing an entity with the same moniker as an entity in the database, the business information application program determines how to resolve the conflict and merge the data appropriately. In some embodiments, if the entity in the template was created after the entity in the database, the entity in the database may be replaced by the entity in the template. If the entity in the template was created before the entity in the database, the entity might not be imported. To resolve some conflicts, a user may be prompted to select which entity to keep or may default to keep the most current information.

Figure 1:
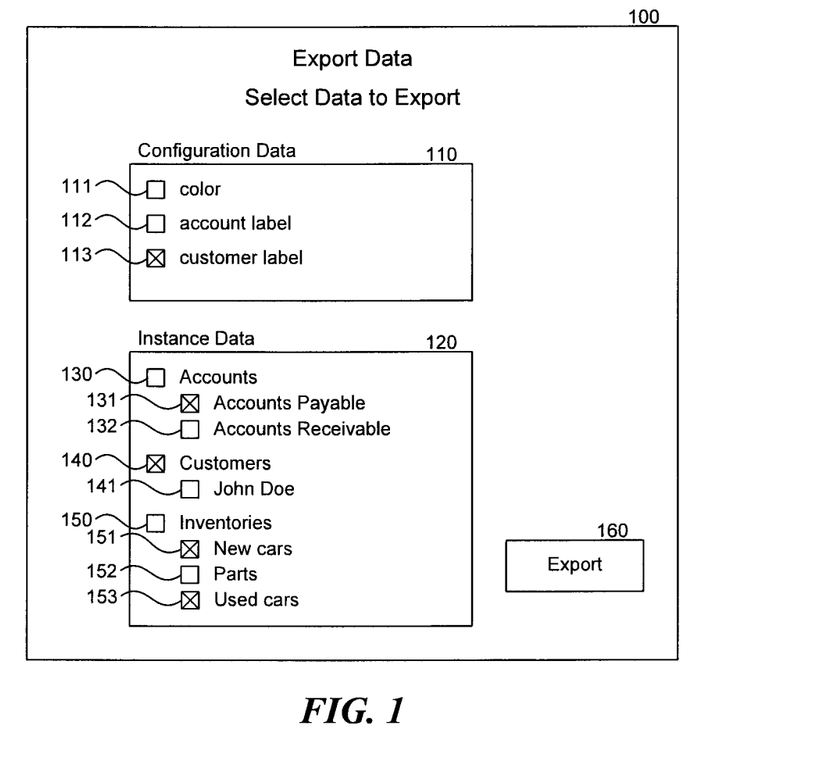
FIG. 1 is a display page illustrating the selection of configuration data and instance data for exporting to a template file in some embodiments.

FIG. 1 is a display page illustrating the selection of configuration data and instance data for exporting to a template file in some embodiments. The display page 100 includes a configuration data area 110 and an instance data area 120. The configuration data area includes a listing of configuration data that is available to be exported. In this example, the configuration data includes color data 111, an account label 112, and a customer label 113. The user has selected to export the customer label as indicated by the "X." The instance data area includes a listing of the instance data that is available for export. In this example, the instance data has been separated into three groups: Accounts 130, Customers 140, and Inventories 150. The account data includes Accounts Payable 131 and Accounts Receivable 132; the list of customers about whom information is available for export includes John Doe 141; and the inventories available for export includes New Cars 151, Parts 152, and Used Cars 153. The user has selected to export the Accounts Payable account, John Doe's customer information, and the New and Used cars inventories as indicated by the "Xs." Once the user has finished selecting data for export, the user may begin the export process by clicking on the Export button 160.

Figure 2:
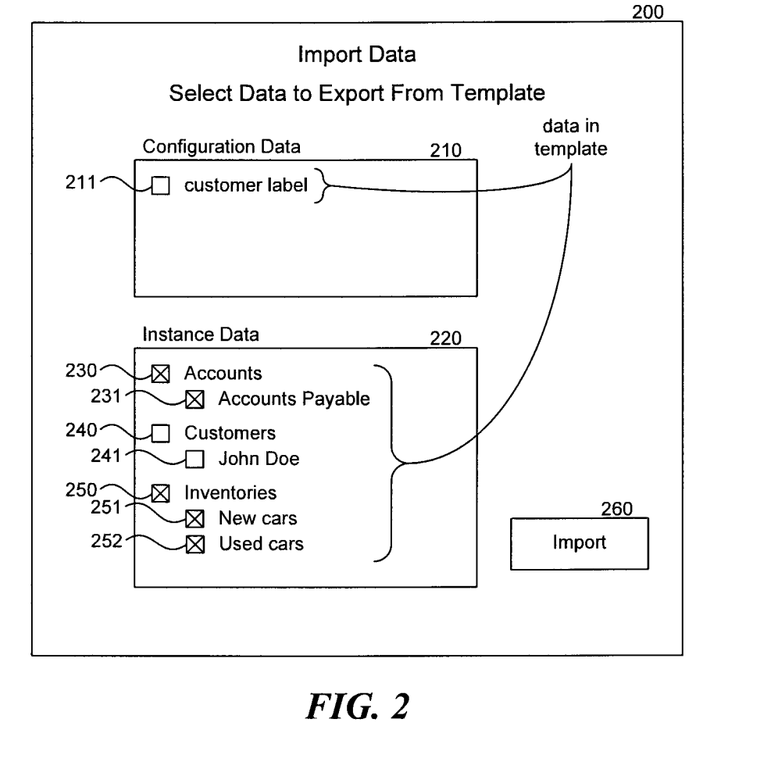
FIG. 2 is a display page illustrating the selection of the configuration data and instance data for importing a template file in some embodiments.

FIG. 2 is a display page illustrating the selection of the configuration data and instance data for importing a template file in some embodiments. The display page 200 includes a configuration data area 210, which displays the configuration data available for import from the template file, and an instance data area 220, which displays the instance data available for import from the template file. The data that is available for import reflects the data that the user selected in the example provided in FIG. 1. The configuration data available for import is customer label information 211, which, in this example, the user has not selected to import. The instance data has been separated into three groups: Accounts 230, Customers 240, and Inventories 250. A user may select to import an Accounts Payable account 231, data about one customer, John Doe 241, a New Car inventory 251, and a Used Car inventory 252. In this example, the user has selected to import the Accounts Payable account, and the New and Used Car inventories. In this example, the user may begin the import process by clicking on the Import button 260.

Figure 3:
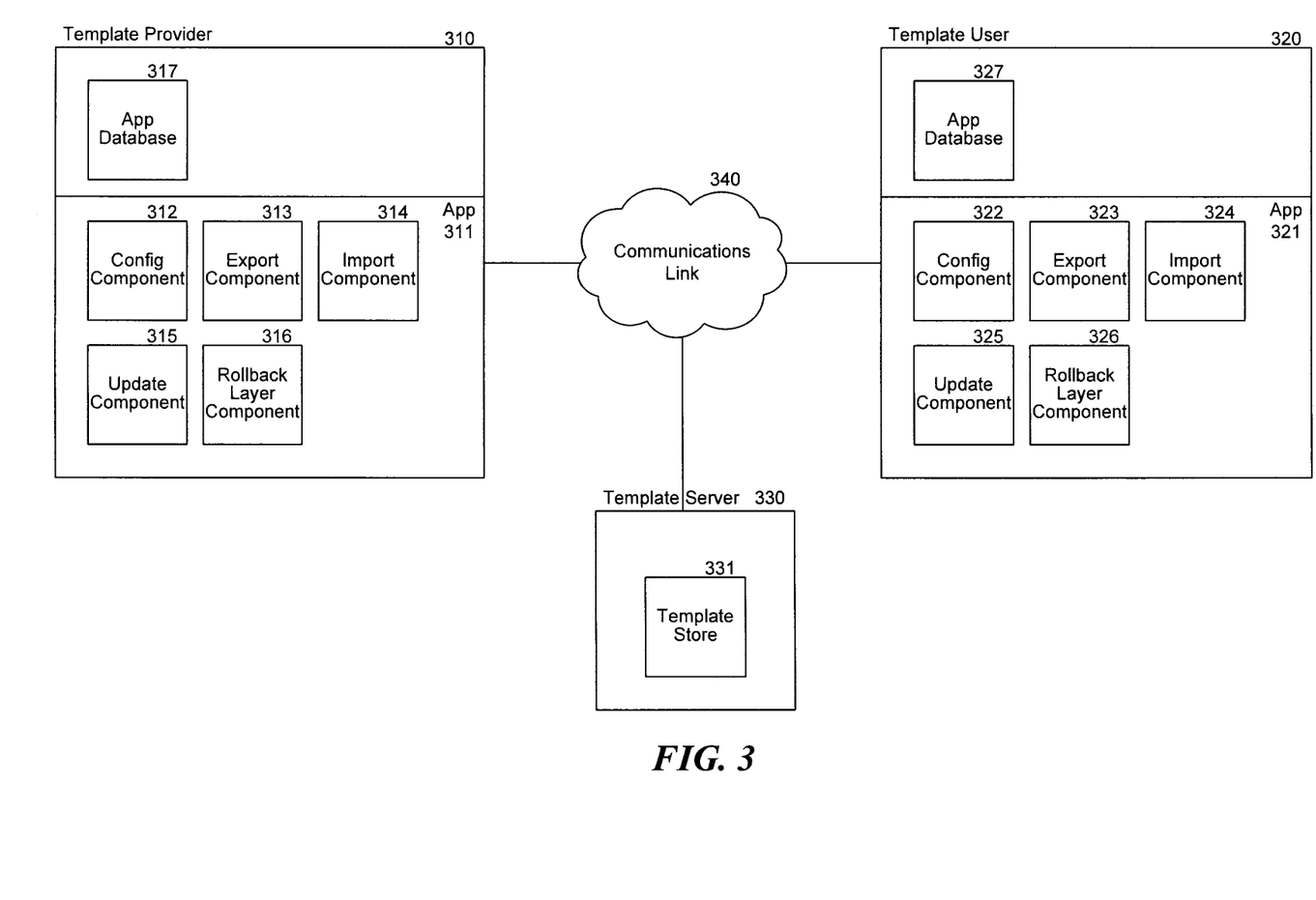
FIG. 3 is a block diagram that illustrates components of the business information application program that provides a business template management system in some embodiments.

FIG. 3 is a block diagram that illustrates components of the business information application program that provides a business template management system in some embodiments. An instance of the business information application program may be stored on a template provider computer 310 and a template user computer 320. The template provider computer and the template user computer may be connected via a communications link 340. The template provider computer may store templates on a template server 330 to download and import by the template user computer. The template provider computer includes an instance of the application program 311 and an application database 317. The application program includes the business logic of the application program along with a configuration component 312, an export component 313, an import component 314, an update component 315, and a rollback layer component 316. The configuration component is used by a user to set the configuration data of the application program, which is stored in the application database. The update component is used to define and populate the application database with the data of the business entities. The export component allows a user to export configuration data and instance data from the application database and stores the data in a template file. The import component inputs a template file and configures an instance of the application in accordance with the configuration data and instance data of the template file. As described above, the business template management system may allow template files to be imported at different times into an instance of an application program. The rollback layer component allows a user to rollback the importing of a template file or to roll forward to a template file that has been previously rolled back.

The template user computer includes an instance of the application program 321 and an instance of the application database 327. The application program includes a configuration component 322, an export component 323, an import component 324, an update component 325, and a rollback layer component 326, all of which function in the same manner as the corresponding components for the template provider computer as described above. The template server 330 includes a template store 331 that contains templates that have been uploaded by various template provider computers. The template server may receive requests from the template user computer for templates. Upon receiving a request, the template server retrieves the requested template from the template store and provides it to the template user computer for importing configuration data and instance data into the application program.

Figure 4:
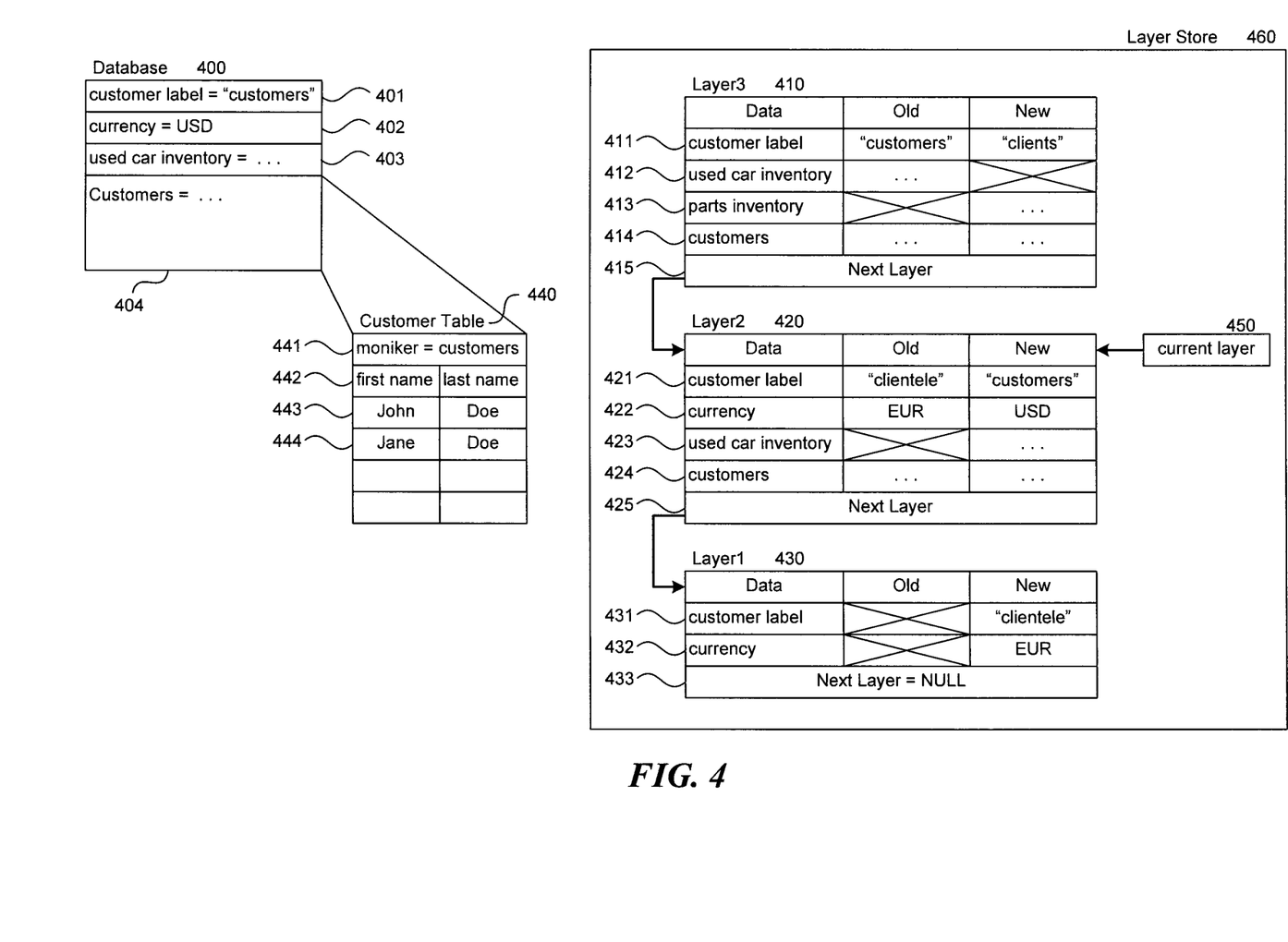
FIG. 4 is a block diagram of the database and a layer store in some embodiments.

FIG. 4 is a block diagram of the database and a layer store in some embodiments. The Database 400 is a source of information for the business information application program. The database contains two configuration options (customer label 401 and currency 402). The customer label has a value of "Customers" and currency has a value of USD (US Dollar). The customer label might be used, for example, to configure a form or a menu of the business information application program's user interface to include the term "customer," rather than "client" or "donor." The database also stores two instance data entities (used car inventory 403 and customers 404). Instance data are reflected with a name, such as "used car inventory" and an ellipses, indicating that additional information is stored. The Customers Table 440 provides an example of how instance data may be stored in one embodiment. Customer Table provides a moniker value 441, the unique identifier used to track information, a row 442 that provides a label for each column in the table, and rows 443 and 444 that provide information about specific customers. Row 443 provides information about a customer whose first name is John and whose last name is Doe. One skilled in the art will recognize that instance data stored in tables may consist of any number of rows and columns, each column corresponding to a specific attribute and each row reflecting the attributes associated with a specific item about which information is stored in the table. For example, Customer Table 440 may contain more information about each customer, such as a phone number, address, or purchasing habits, and may contain information about any number of customers. When the business information application program performs a function, such as executing a query for customer information, the business information application program processes the information stored in the database.

Layer Store 460 stores layers containing information about the modifications to the database that occurred when the layer was created. In this example, the layer store contains three layers, Layer3 410, Layer2 420, and Layer1 430 and a current layer pointer 450. Each layer consists of rows for each instance data entity and configuration parameter that was modified when the layer was created. For example, Layer3 has a row for customer label 411, used car inventory 412, parts inventory 413, and customers 414. Each row comprises a data attribute, an old value, and a new value. Each row provides information to determine the values for a specific configuration parameter or instance data entity both before and after the layer was created. Row 411 in Layer3 indicates that the customer label configuration parameter was changed from "customers" to "clients" when Layer3 was created. An "X" in a row in the "old" column indicates that the associated configuration parameter or instance data entity did not exist in the database prior to the layer being created while an "X" in the "new" column indicates that data was removed when the layer was created. Row 412 indicates that the used car inventory entity was removed from the database when Layer3 was created while row 413 indicates that a parts inventory was added when Layer3 was created. Each layer also stores a pointer (415, 425, and 433, respectively) to the next layer so that the layer store can be easily navigated. The current layer pointer 450 points to the layer that was most recently applied to the database. As the business information application program rolls the database from layer to layer, data in the database may be altered, removed, or added to reflect the information stored in the layer. For example, if the database were rolled back to Layer1, the instance data may be removed and the configuration data may be altered to reflect the values stored in Layer1. One skilled in the art will recognize that while FIG. 4 provides an illustration that is easily comprehensible by a human reader, the actual information may be stored using different data structures and data organizations.

The computing device on which the business template management system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the management system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

The business template management system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
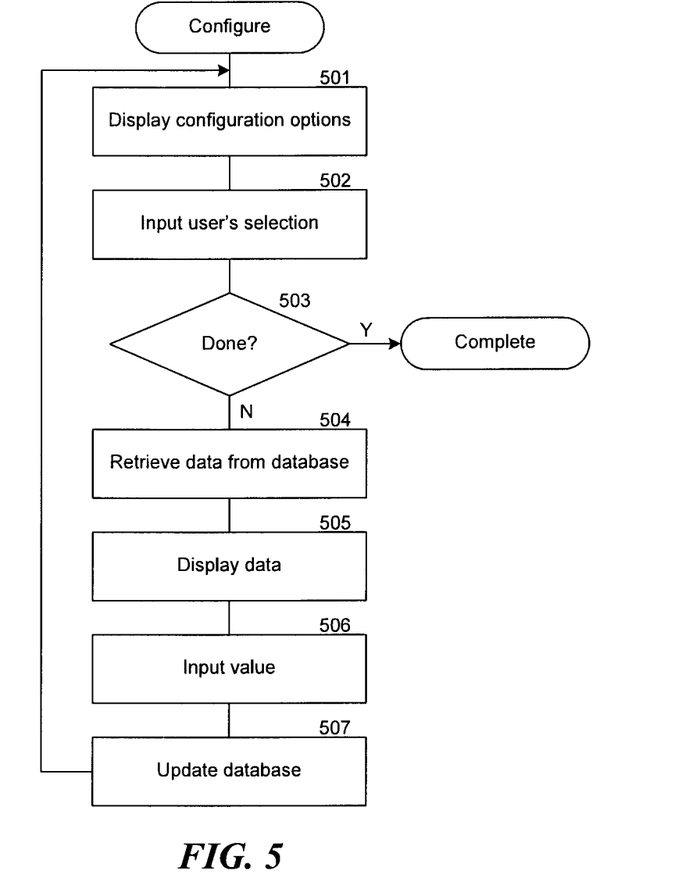
FIG. 5 is a flow diagram that illustrates the processing of the configure component of the business template management system in some embodiments.

FIG. 5 is a flow diagram that illustrates the processing of the configure component of the business template management system in some embodiments. The configure component allows a user to configure the business information application program by specifying configuration data. In block 501, the component displays the configuration options available to the user. In block 502, the component inputs a selection of a configuration option from the user. In decision block 503, if the user has finished inputting configuration data, then the component completes, else component continues at block 504. In block 504, the component retrieves the current configuration data corresponding to the selected configuration options from the application database. In block 505, the component displays the retrieved configuration data to the user. In block 506, the component inputs a new value from the user for the configuration data. In block 507, the component updates the application database with the input value for the configuration data and then loops to block 501 to allow the user to select a different configuration option.

Figure 6:
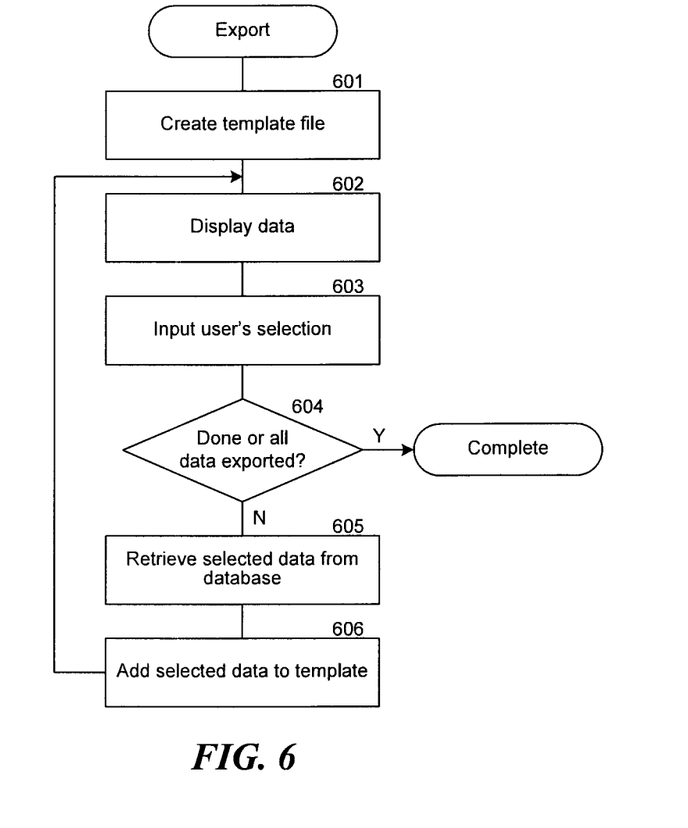
FIG. 6 is a flow diagram that illustrates the processing of the export component of the business template management system in some embodiments.

FIG. 6 is a flow diagram that illustrates the processing of the export component of the business template management system in some embodiments. The export component allows a user to specify the configuration data and instance data that is to be exported. In block 601, the component creates a template file for storing the exported data. In blocks 602 to 606, the component loops allowing the user to specify the data to be exported. In block 602, the component displays the data available for export to the user. In block 603, the component inputs from the user a selection of data to be exported. In decision block 604, if the user has finished specifying the configuration data and instance data to be exported, or if all configuration data and instance data have already been exported, then the component completes, else the component continues at block 605. In block 605, the component retrieves the selected configuration data and instance data from the application database. In block 606, the component adds the retrieved data to the template file and then loops to block 602 to allow the user to specify additional data to be exported.

Figure 7:
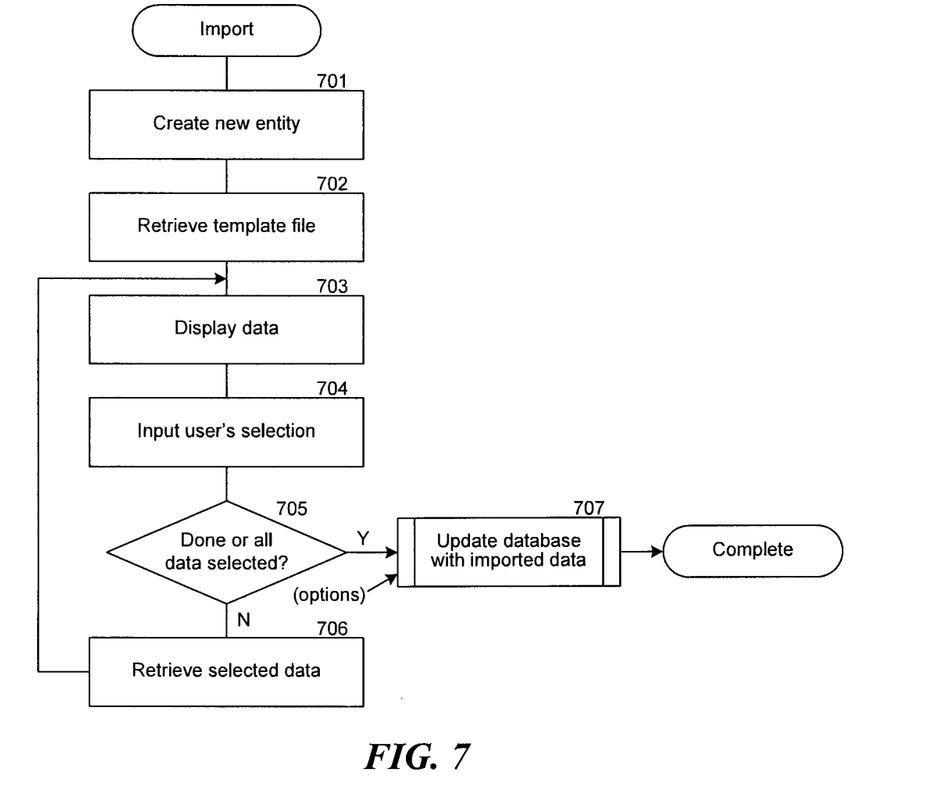
FIG. 7 is a flow diagram that illustrates the processing of the import component of the business template management system in some embodiments.

FIG. 7 is a flow diagram that illustrates the processing of the import component of the business template management system in some embodiments. The import component allows a user to specify the data of a template file that is to be imported into an instance of the application program's database. In block 701, if the database is being initialized, then the component allows the user to specify to create a new business organization. For example, the user may specify that the new business organization is the Acme Company. In block 702, the component retrieves the template file. In blocks 703 to 706, the component loops allowing the user to specify the configuration data and instance data of the template file that is to be imported. In block 703, the component displays an indication of the configuration data and instance data of the template file. In block 704, the component receives a selection of data from the user. In decision block 705, if the user has finished importing data, or if all the data has already been selected, the component continues at block 707, else the component continues at block 706. In block 706, the component retrieves the selected data from the template file and then loops to block 703 to allow the user to import additional data. In block 707, the component invokes a component to update the database with the imported data and then completes.

Figure 8:
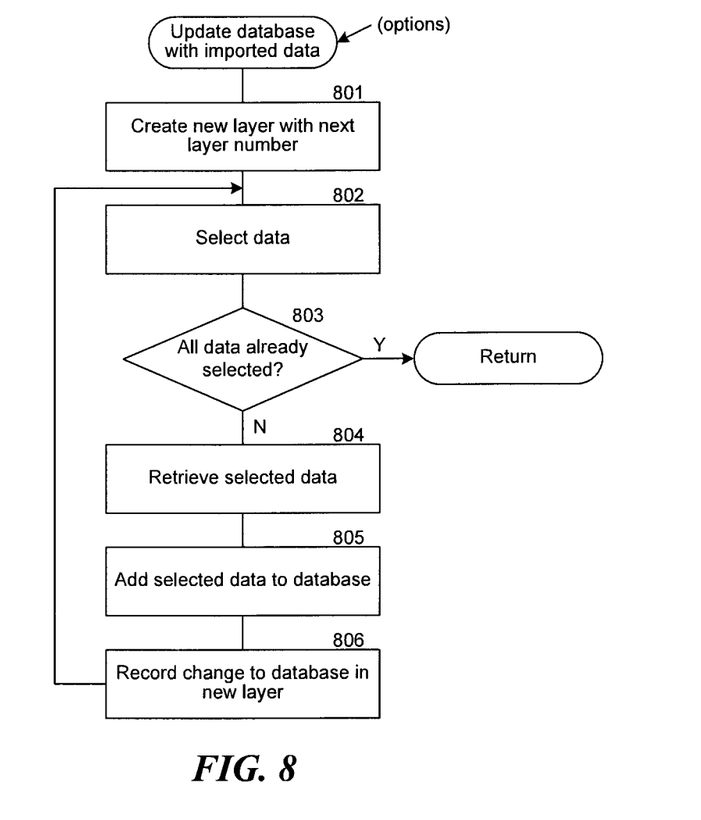
FIG. 8 is a flow diagram that illustrates the processing of the update database with imported data component of the business template management system in some embodiments.

FIG. 8 is a flow diagram that illustrates the processing of the update database with imported data component of the business template management system in some embodiments. The component updates the database with the instance data and configuration data. The component also stores the configuration data and instance data that is imported in layers to support the rollback and roll forward functions described above. In block 801, the component creates a new layer with the next layer number. In blocks 802 to 806, the component loops selecting the next data to be imported, updating the database with the imported data, and recording any changes to the database in the new layer. In block 802, the component selects data to be imported. In decision block 803, if all the data has already been selected, then the component returns, else the component continues at block 804. In block 804, the component retrieves the selected data that is to be imported. In block 805, the component adds the retrieved data to the database. In block 806, the component records any changes made to the database in the new layer and then loops to block 802 to select additional data to be imported.

Figure 9:
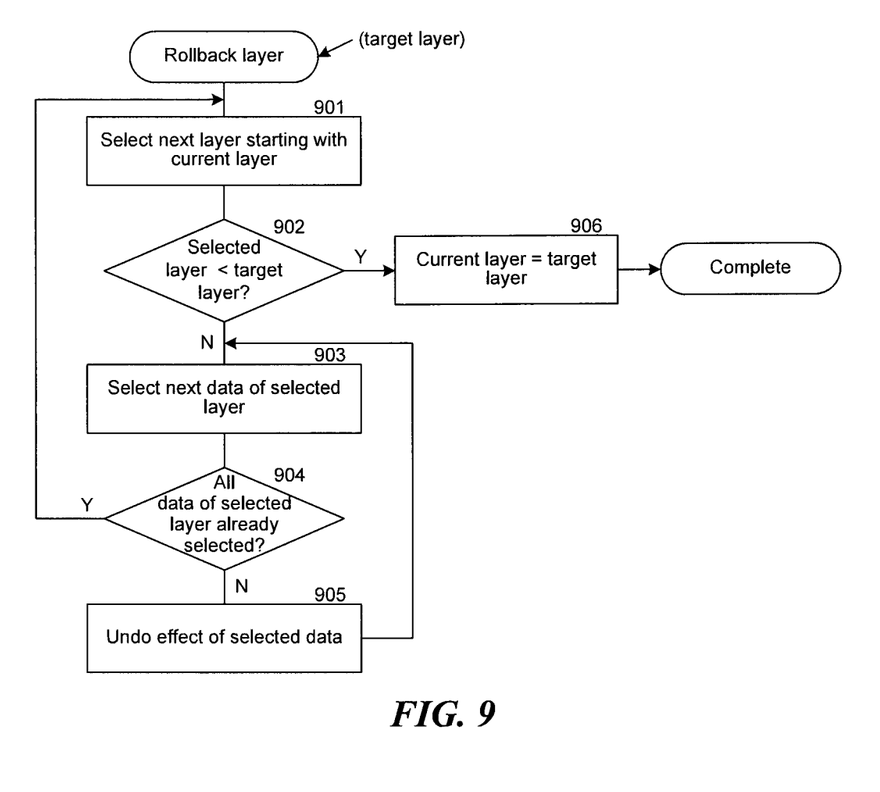
FIG. 9 is a flow diagram that illustrates the processing of the rollback layer component of the business template management system in some embodiments.

FIG. 9 is a flow diagram that illustrates the processing of the rollback layer component of the business template management system in some embodiments. The component is passed a target layer to which the user wants to roll back the application database. In blocks 901 to 905, the component loops selecting each layer between the current layer and the target layer and affecting the rollback of the data of the database. In block 901, the component selects the next layer starting with the current layer. In decision block 902, if the number of the selected layer is less than the number of the target layer, then the component continues at block 906, else the component continues at block 903. In blocks 903 to 905, the component loops selecting the data of the selected layer and undoing the effect of importing the selected data. In block 903, the component selects the next data of the selected layer. In decision block 904, if all the data in the selected layer has already been selected, then the component loops to block 901 to select the next layer, else the component continues at block 905. In block 905, the component undoes the effect of the selected data. For example, if the selected data indicated a new instance of an entity, then the undoing of the effect would be to remove that instance of the entity from the database. As another example, if selected data indicated that instance data within the database had been removed from the database, the instance data would be added to the database. In block 906, the component sets the current layer pointer to point to the target layer and completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computer system for configuring a business information application program, the business information application program having a user interface, the method comprising:
providing a first database with instance data for each instance of each entity represented in the first database and with configuration data specifying how the business information application program is to be configured, each entity having a unique identifier;
receiving, via the user interface of the business information application program, instance data and configuration data for the first database;
storing the received instance data and configuration data in the first database;
generating a display page for selecting configuration data and instance data at least in part by,
for each of a plurality of configuration data elements in the first database, adding an indication of the configuration data element to the display page, and
for each of a plurality of instance data elements in the first database, adding an indication of the instance data element to the display page;
receiving, via the display page, a user selection of at least one configuration data element to export from the first database, wherein the selected at least one configuration data element to export from the first database does not include all of the configuration data elements in the first database;
receiving, via the display page, a user selection of at least one instance data element of a first entity represented in the first database to export from the first database, wherein the selected at least one instance data element of the first entity does not include all of the instance data elements of the first entity;
receiving, via the display page, a user selection of at least one instance data element of a second entity represented in the first database to export from the first database, wherein the selected at least one instance data element of the second entity does not include all of the instance data elements of the second entity;
extracting the user selected configuration data elements from the first database;
storing, in a template file, the extracted configuration data elements, wherein the template file is not an element of a database;
extracting the user selected at least one instance data element of the first entity represented in the first database;
storing, in the template file, the extracted at least one instance data element of the first entity represented in the first database;
extracting the user selected at least one instance data element of the second entity represented in the first database;
storing, in the template file, the extracted at least one instance data element of the second entity so that the template file includes extracted instance data elements for at least two entities represented in the first database; and
providing the template file to another computer system having the business information application program and a second database with instance data and configuration data, so that the other computer system can set instance data and configuration data of the second database based on the instance data and configuration data stored in the template file, the first database including at least one entity associated with a first unique moniker and having a first name and another entity associated with a second unique moniker and the second database including at least one entity associated with the first unique identifier and having a second name different from the first name.

2. The method of claim 1 wherein the other computer system uses a second unique moniker of an entity specified in the template file to identify a corresponding entity in the second database.

3. The method of claim 2 wherein when no entity with the second unique moniker exists in the second database, adding an entity with the second unique moniker to the second database.

4. The method of claim 1 wherein the instance data and configuration data of the second database are stored in layers, so that the instance data and configuration data can be rolled back on a layer-by-layer basis.

5. The method of claim 1 wherein configuration data includes report definition information and user interface label information.

6. The method of claim 1 wherein an entity is an account and instance data for each account includes information relating to that account.

7. A tangible, computer-readable medium containing instructions for configuring a business information application program, the business information application program having a user interface, by a method comprising:
    providing, at a first computer system, a first database having instance data for each instance of each entity represented in the first database and configuration data specifying how the business information application program is to be configured;
    receiving, via the user interface of the business information application program, instance data and configuration data for the first database;
    displaying a display page for selecting configuration data and instance data from the first database, the display including an indication of at least one configuration data element in the first database and indication of at least one instance data element in the first database;
    receiving, via the display page, a user selection of at least one configuration data element to export from the first database and at least one instance data element to export from the first database;
    extracting instance data and configuration data from the first database;
    storing in a template file the extracted instance data and configuration data; and
    providing the template file to a second computer system having the business information application program and a second database with instance data and configuration data, so that the second computer system can set instance data and configuration data of the second database based on the instance data and configuration data stored in the template file.

8. The tangible, computer-readable medium of claim 7 wherein the first computer system and the second computer system are the same computer system.

9. The tangible, computer-readable medium of claim 7 wherein the second database contains a set of layers, each layer storing instance data and configuration data, so that the instance data and configuration data can be rolled back on a layer-by-layer basis.

10. The tangible, computer-readable medium of claim 9 wherein the set of layers includes a current layer containing the instance data and configuration data that are currently selected.

11. The tangible, computer-readable medium of claim 10 further including instructions for receiving from a user a selection of a layer and when the selected layer is not the current layer, rolling back or rolling forward to the selected layer.

12. The tangible, computer-readable medium of claim 7 wherein an entity is an account and instance data for each account includes account information relating to that account.

13. The tangible, computer-readable medium of claim 7 wherein the first database contains a set of layers, each layer storing instance data and configuration data, so that the instance data and configuration data can be rolled back on a layer-by-layer basis.

14. A system of a first computer system, having a memory and a processor, for configuring a business information application program, the business information application program having a user interface, the system comprising:
    a first database having instance data for each entity represented in the first database and having configuration data specifying how the business information application program is to be configured;
    a component that extracts instance data and configuration data from the first database;
    a component that stores in a template file the extracted instance data and configuration data; and
    a component that provides the template file to a second computer system having the business information application program and a second database with instance data and configuration data, so that the second computer system can set instance data and configuration data of the second database based on the instance data and configuration data from the first computer system that is stored in the template file
    wherein at least one of the components comprises computer-executable instructions stored in the memory for execution by the processor.

15. The system of 14 wherein the first computer system and the second computer system are the same computer system.

16. The system of claim 14 wherein the second database includes a set of layers, each layer storing instance data and configuration data, so that the instance data and configuration data can be rolled back on a layer-by-layer basis.

17. The system of claim 16 further comprising a component for receiving from a user a selection of a layer and a component for rolling back or rolling forward to the selected layer.

18. The system of claim 17 including a pointer to the layer containing the currently selected instance data and configuration data.

19. The system of claim 14 wherein configuration data includes report definition information and user interface label information.

20. The system of claim 14 wherein an entity is an account and instance data for each account includes information relating to that account.

* * * * *